(12) United States Patent
Achterberg

(10) Patent No.: US 8,463,729 B2
(45) Date of Patent: Jun. 11, 2013

(54) LP RELAXATION MODIFICATION AND CUT SELECTION IN A MIP SOLVER

(75) Inventor: Tobias Achterberg, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 12/628,837

(22) Filed: Dec. 1, 2009

(65) Prior Publication Data

US 2011/0131167 A1    Jun. 2, 2011

(51) Int. Cl.
| | |
|---|---|
| G06F 17/00 | (2006.01) |
| G06F 15/00 | (2006.01) |
| G06F 7/60 | (2006.01) |
| G06F 17/10 | (2006.01) |
| G06N 5/02 | (2006.01) |
| G06N 99/00 | (2010.01) |
| G06E 1/00 | (2006.01) |
| G06E 3/00 | (2006.01) |
| G06G 7/00 | (2006.01) |

(52) U.S. Cl.
USPC ................................ 706/47; 706/10; 703/2

(58) Field of Classification Search
None
See application file for complete search history.

(56) References Cited

U.S. PATENT DOCUMENTS

| | | | | |
|---|---|---|---|---|
| 8,082,549 | B2* | 12/2011 | Corley et al. | 718/104 |
| 2009/0228291 | A1* | 9/2009 | Rothberg et al. | 705/1 |
| 2009/0228417 | A1* | 9/2009 | Rothberg | 706/46 |

OTHER PUBLICATIONS

Achterberg, Tobias. "Constraint Integer Programming." University of Berlin (2007).*
Danna, Emilie; Rothberg, Edward; Pape, Claude Le. "Exploring relaxation induced neighborhoods to improve MIP solutions." Mathematical Programming p. 71-90 102.1 (2005).*
Achterberg, Tobias. "SCIP—a framework to integrate Constraint and Mixed Integer Programming." (2004).*
Fischetti et al., "Feasibility pump 2.0," Math Prog. Comp. (2009) 1:201-222.
Fischetti et al., "The feasibility pump", Mathematical Programming, 104(1):91-104,2005.
A. Zanette, M. Fischetti, and E. Bales, Can pure cutting plane algorithms work?, Integer. Programming and Combinatorial Optimization IPCO 2008.

* cited by examiner

Primary Examiner — Kakali Chaki
Assistant Examiner — Daniel Pellett
(74) Attorney, Agent, or Firm — Useful Arts IP

(57) ABSTRACT

Mixed integer programs (MIP) are solved by constructing and solving associated linear programming (LP) relaxation problems. The LP relaxations are iteratively constructed through the introduction of cutting planes that are derived using one solution of an LP, then filtered based on an alternative solution to the LP. The LP relaxation is constructed, and its alternate solution is derived, to efficiently converge to a solution for the MIP.

27 Claims, 5 Drawing Sheets

LP RELAXATION MODIFICATION AND CUT SELECTION IN A MIP SOLVER

BACKGROUND

The present invention relates to MIP (mixed integer program) solvers. More particularly, the present invention relates to the use of intermediate related linear programs and their solutions to derive an optimal solution to a MIP problem.

Optimization problems and techniques for solving them are well-known. An optimal solution is one that most closely satisfies desired criteria, typically to minimize or maximize an objective function. Constraints dictate which solutions are feasible, i.e., which solutions are physically realizable and meaningful. A solution is called feasible if it satisfies all constraints. A feasible solution is called optimal, if it has the best objective function value under all feasible solutions.

A subset of optimization problems is linear programming (LP) problems. Linear programming is a technique for optimization of a linear objective function, subject to linear equality and linear inequality constraints. Thus, linear programming provides a way to achieve the best outcome (such as maximum profit or lowest cost) for a given mathematical model by determining the parameters that meet the linear constraints and maximizing or minimizing the associated objective function. The constraints on individual parameters or combinations of parameters can be considered cuts through N-space (where N is the number of parameters), which generate a multi-faceted polyhedron. The parameters may correspond to physical resources, such as acres of farmland or employees in a factory. When one or more of the parameters is also constrained to be an integer, the problem is called a mixed integer programming (MIP) problem. While linear programming problems are theoretically easy to solve (solveable in polynomial time), mixed integer programming problems are in general very difficult optimization problems (NP-hard problems), both in theory and in practice.

The simplex method is a well-known method for solving LP problems. A simplex is a geometric construct, a "polytope" of vertices, edges, and facets. Solutions are found and evaluated by traversing the simplex in a methodical way. Problems may be formulated in a standard "primal" form or in a related "dual" or "duplex" form. Slack variables, used to convert inequality constraints into equality constraints, may be introduced. A description of the primal simplex algorithm is provided by G. B. Dantzig, Maximization of a linear function of variables subject to linear inequalities, in Activity Analysis of Production and Allocation, T. Koopmans, ed., John Wiley & Sons, New York, 1951, pp. 339-347. A description of the dual simplex algorithm is provided by C. E. Lemke, The dual method of solving the linear programming problem, Naval Research Logistics Quarterly 1 (1954), pp. 36-47. Both the primal and dual versions are considered "simplex algorithms."

As a review of standard nomenclature and structure, a linear program in standard equation form is given by
min $c^T x$
such that $Ax=b$, and
$x \geq 0$.
With n variables and m equations, $n \geq m$, a subset B of the columns $\{1, \ldots, n\}$ with cardinality $|B|=m$ is called a "basis" if the quadratic submatrix $A_B$ that consists of the columns of A which correspond to B is non-singular. For a basis B, the variables in B are called "basic," and the variables in $\{1, \ldots, n\}$ which are not in B are called "non-basic."

For a given basis B, the corresponding basic primal solution $x^*$ is defined as:
$x_N^* = 0$ (i.e. $x_j^* = 0$ for all j not in B), and
$x_B^* = A_B^{-1} b$.
A basis B is called "primal feasible" if $x^* \geq 0$.
The dual of the linear program above is
max $b^T y$
such that $A^T y + r = c$, and
$r \geq 0$.
For a given basis B, the corresponding basic dual solution ($y^*$, $r^*$) is defined as:
$r_{B^*} = 0$,
$y^* = (A_B^{-1})^T c_B$, and
$r_N^* = c_N - A_N^T y^*$.
A basis B is called "dual feasible" if $r^* \geq 0$, and a basis B is called "optimal" if it is primal feasible and dual feasible.

A MIP solver is a computing or computer system, or a computing or computer program, designed or programmed to solve a MIP problem. MIP solvers commonly employ branch-and-bound and/or branch-and-cut strategies. In the branch-and-bound strategy, a current feasible region (with integer restrictions ignored) is divided into two smaller regions by the imposition of two new constraints derived from an approximate solution. This division, or branching, is such that the optimal solution must appear as the solution to one of the two new programs. The branch-and-cut strategy is similar, except that the feasible region is diminished without being split, by adding a single new constraint at each stage.

An LP relaxation is the problem that arises by replacing the MIP constraint that a variable be an integer, such as 0 or 1, with a weaker constraint that the variable be within a range, such as [0,1]. The LP relaxation can then be solved using LP techniques. The objective function may also be modified to encourage the optimal solution for a variable to be equal to or close to an integer. The solution to the LP relaxation can then be used to find an optimal solution to the MIP.

The formulation and solution of a suitable LP relaxation of a MIP is an important part of current MIP solvers. For many MIP instances, the solution to the LP relaxation is not unique. Instead, there exist multiple optimal solutions, and the MIP solving process, including the time needed to solve a given MIP problem instance, is greatly affected by the choice of the optimal solution to the LP relaxation.

The simplex algorithm used to solve the LP relaxation picks one of these alternative solutions and returns it to the MIP solver. The MIP solver then applies primal heuristics to use this optimal solution as a seed to find feasible solutions. Additionally, the LP solution serves as input for cutting plane separators in a branch-and-cut context, or defines candidates for a decision on how to split the problem into two parts (branching) in a branch-and-bound context. In all of these cases, it makes a significant difference with respect to solver performance which of the alternative optimal LP solutions is used.

A known approach to selecting an alternative LP solution has been investigated by A. Zanette, M. Fischetti, and E. Balas "Can Pure Cutting Plane Algorithms Work?", Integer. Programming and Combinatorial Optimization IPCO 2008, hereinafter "Zanette et. al."). This approach uses lexicographic ordering to select an optimal solution. In another approach, released as part of the IBM product ILOG CPLEX 11 in November 2007, the program solves a series of auxiliary LPs in an attempt to find a vertex on the optimal face of the LP polyhedron for which only a few integer variables have a fractional value. The auxiliary LPs are defined in a similar way as in the "Feasibility Pump" heuristic of Matteo Fischetti, Fred Glover, and Andrea Lodi; see Fischetti et al., "The feasibility pump", Mathematical Programming, 104(1):91-104, 2005. In the CPLEX 11 approach, in many cases the auxiliary LP is almost as large as the original LP relaxation; as a result, searching for a favorable point in the associated search space is very time-consuming. Hence the method can only be applied in a very conservative fashion.

Another challenge with MIP solvers is determining which cutting planes should be part of the LP relaxation. Too many cuts deteriorate LP solving performance and numerical stability; too few cuts deteriorate the dual bound that is needed to prove optimality. Known approaches apply a cut filtering mechanism by collecting in intermediate storage the cutting planes that separate the current LP solution and then selecting only a subset of these cuts to be part of the LP; see, e.g., Achterberg, "Constraint Integer Programming."

SUMMARY

To determine an allocation of physical resources using a computer or computing system, or a computer or computing program, a mixed integer programming (MIP) model and an outcome objective are specified. One or more processors derive a linear programming (LP) relaxation model associated with the MIP model, use the LP relaxation model to compute a first LP optimal solution, and find a set of cutting planes that separate the first LP optimal solution from the set of integer feasible solutions. The processor(s) use the LP relaxation model to compute a second LP optimal solution different than the first LP optimal solution, apply filtering on the set of cutting planes using the second LP optimal solution as a reference solution, and apply cuts that survived cut filtering to derive a new LP relaxation model.

In other aspects, A machine-implemented method of allocating physical resources uses a model including a mixed integer program (MIP) and using an original LP relaxation of the MIP having variables, slacks, and an objective function. The original LP relaxation of the MIP is solved to obtain a first optimal LP relaxation solution. A second alternative LP relaxation solution is found by solving the original LP relaxation of the MIP to obtain an initial LP relaxation solution; and by fixing variables and slacks with non-zero reduced costs, and setting the objective function to zero to obtain a modified LP relaxation. The LP relaxation is further modified by fixing some of the variables or by modifying the objective function. The modified LP relaxation is solved to obtain a modified LP relaxation solution, and a better solution is chosen between a current best LP relaxation solution and the modified LP relaxation solution to obtain a new current best LP relaxation solution. The current best LP relaxation solution is converted into a primal feasible basis for the original LP relaxation, and an attempt is made to solve the original LP relaxation starting from said primal feasible basis. If the attempt was successful, a resulting basis is used in a subsequent MIP solving process.

These methods may also be embodied as systems or computer program products.

BRIEF DESCRIPTION OF THE SEVERAL VIEWS OF THE DRAWINGS

The present invention may be further understood from the following description in conjunction with the appended drawings. In the drawings.

DETAILED DESCRIPTION

Figure 1:
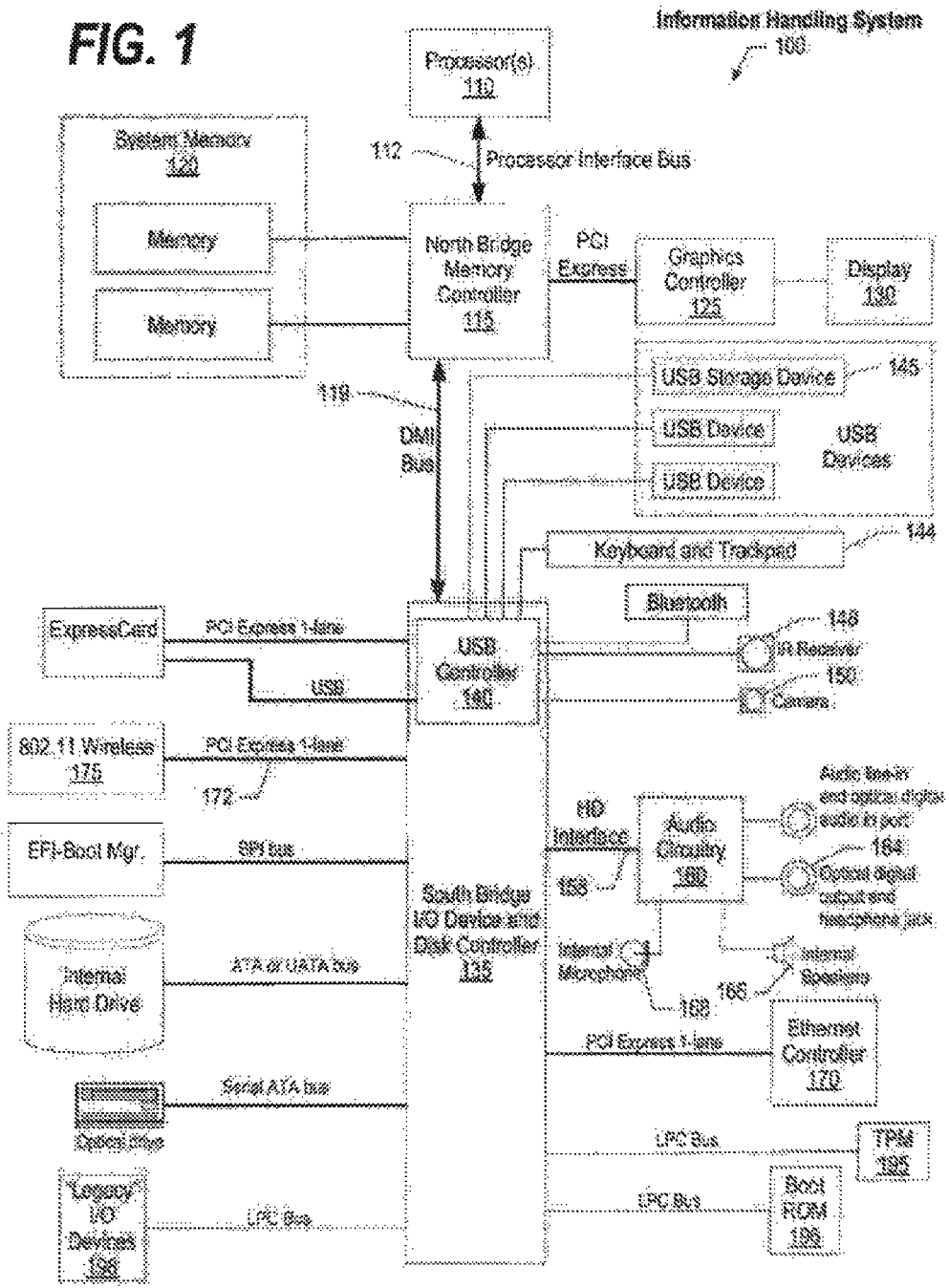
FIG. 1 is a block diagram example of a data processing system that can be used to implement a MIP solver.

Certain specific details are set forth in the following description and figures to provide a thorough understanding of various embodiments of the disclosure. Certain, well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a. portable computer diskette, a. hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with art instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in arty combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on. a remote computer or entirely on the remote computer or server. In the latter scenario, the remote computer may be connected to the users computer through any type of network, including a local, area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified, in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
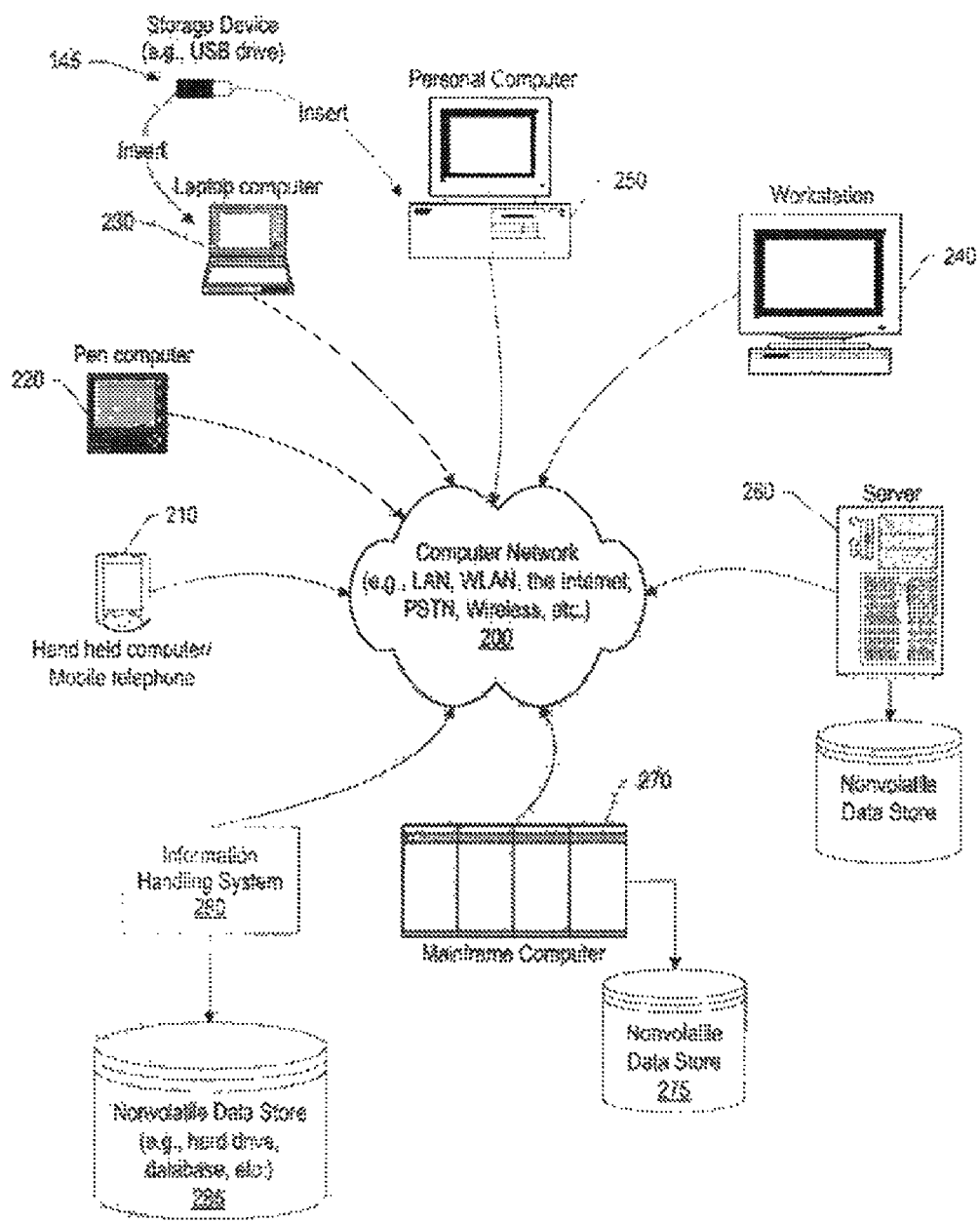
FIG. 2 provides an. extension example of the information handling system environment shown in FIG. 1 to illustrate that a MIP solver can be implemented on a wide variety of information handling systems which, operate in a networked environment.

FIG. 1 illustrates information handling system 100, which is a modified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge, Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" Chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system, ExpressCard 155 supports both PCI Express and USB connectivity as it connects to Southbridge 135 using both the Universal Serial Bus (USB) and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172, LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of FISM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players, Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer networks that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depict separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

The data processing system of FIG. 1 can be used to implement a mixed integer program (MIP) solver; furthermore, a MIP solver can be implemented on a wide variety of information handling systems which operate in a networked environment as described in FIG. 2.

A MIP solver is an optimization engine that searches for potential solutions that correspond to an outcome objective, such as finding a lowest cost production throughput or the quickest production throughput. MIP solvers iteratively use linear program (LP) relaxation models and their optimal solutions to find the optimal solution to the MIP problem. These problems can be very time consuming to solve, even by very fast processors. Improved MIP solvers are described herein that generally reduce the time required to solve these problems, by more efficiently deriving and solving associated LP relaxation models.

A MIP model defines and structures a problem by a set of equations and inequalities that define components of the problem, such as available resources, demand to be filled, services to be performed, and operating and capital costs. A MIP solver produces solutions of the MIP model that correspond to an outcome objective or business problem, such as a general six month production plan, a one month workforce schedule, or a truck loading plan.

Figure 3:
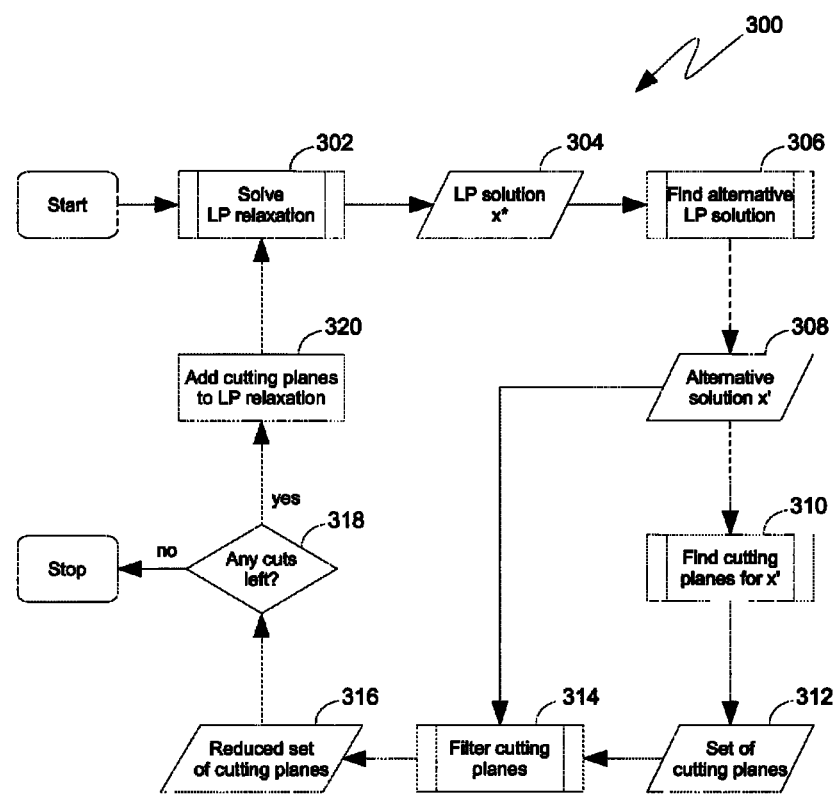
FIG. 3 is a flow chart showing a known method for deriving and filtering cutting planes.

FIG. 3 shows a flow chart 300 of one embodiment of a known technique for iteratively identifying cutting planes and applying them to an LP relaxation as part of a MIP solver. The output of this procedure is a refined LP relaxation and a final solution to this LP. In step 302 an LP relaxation of the MIP is solved, which results in an LP solution x* (304). Then a known method, for example as implemented in CPLEX 11, is used to find (306) an alternative optimal LP solution x' (308) which has more favorable MIP properties, for example a smaller number of integer restricted variables with a fractional value in the LP solution. Note that an LP relaxation typically has many optimal solutions, in the sense that there are typically non-unique ways that the associated objective function can be maximized or minimized. Hence, x* (304) and x' (308) may be distinct and yet both be considered optimal LP solutions.

Next, cutting planes are found (310) that separate x' from the set of integer feasible solutions (as distinguished from the set of non-integer (LP) feasible solutions), resulting in a set of cutting planes (312). In step 314 known methods are used to perform cut filtering on the set of generated cuts, using x' as a reference solution. This filtering generates a reduced set (316) of cutting planes. As determined in step 318, if there are no cuts in the reduced set, then the program stops; otherwise, the cutting planes are added (320) to the LP relaxation, and the processing loop is repeated by again proceeding to step 302.

Figure 4:
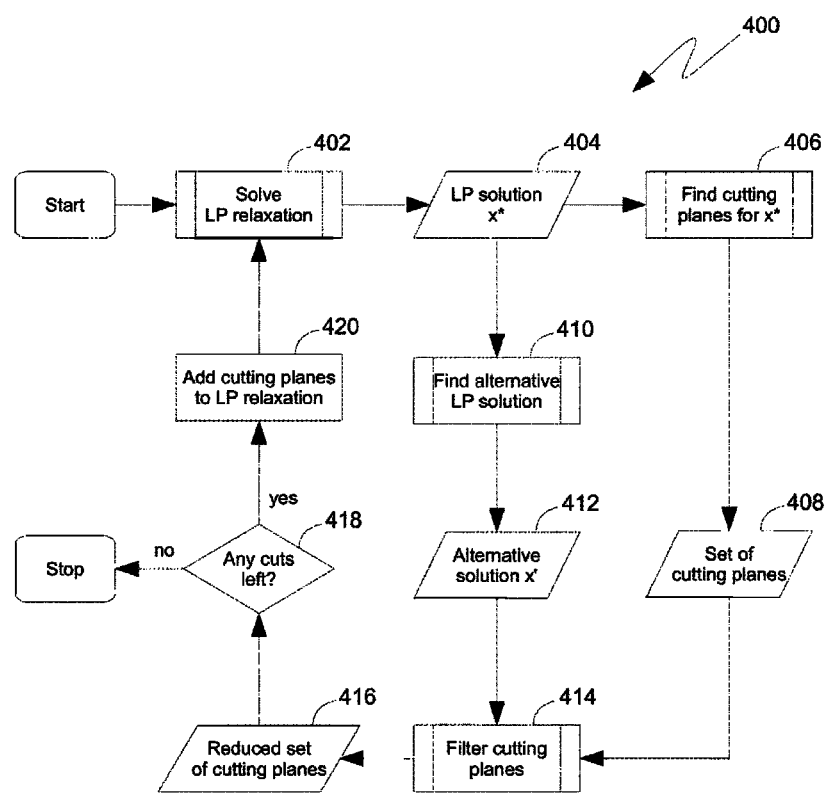
FIG. 4 is a flow chart showing an improved method for deriving and filtering cutting planes.

FIG. 4 shows a flow chart 400 of an improved technique for more efficiently identifying the required cutting planes for the LP relaxation. In step 402 the LP relaxation of the MIP is solved, which results in an LP solution x* (404). Next (406) a set of cutting planes is found (408) that separates the LP solution x* (404) from the set of integer feasible solutions. After the LP solution x* (404) is determined, a method is applied (410) to find an alternative LP solution, which is labeled x' (412). The procedure 410 may be any suitable procedure known in the art, including one implemented in CPLEX 11, the lexicographic ordering described by Zanette et. ah, or any other presently known or not yet known techniques. One such procedure that incorporates various improvements is described below in conjunction with FIG. 5.

Note that the finding (410) of the alternative LP solution may be performed before, after, or simultaneously with the finding (406) of the cutting planes for x*, because these sub-problems are independent. After the set of cutting planes (408) and the alternative LP solution x' (412) have been determined, a filter is applied (414) to the set of cutting planes, using x' (412) as a reference, to generate a reduced set of cutting planes (416). In contrast to known methods in which a cut only needs to be violated by x' (308), in the present embodiment, only those cutting planes that are violated by both solutions x* (404) and x' (412) are allowed to survive and enter the new LP relaxation, thus improving LP solving performance. Usually more cuts will be deleted in the cut filtering (414) than in known methods, and the surviving cuts will usually be stronger than cuts that only violate one solution. As in FIG. 3, if there are no cuts left, as determined in step 418, then the program stops; otherwise the reduced set of cutting planes is added to the LP relaxation (420), which is then solved again as shown in step 402, and the loop continues.

Figure 5:
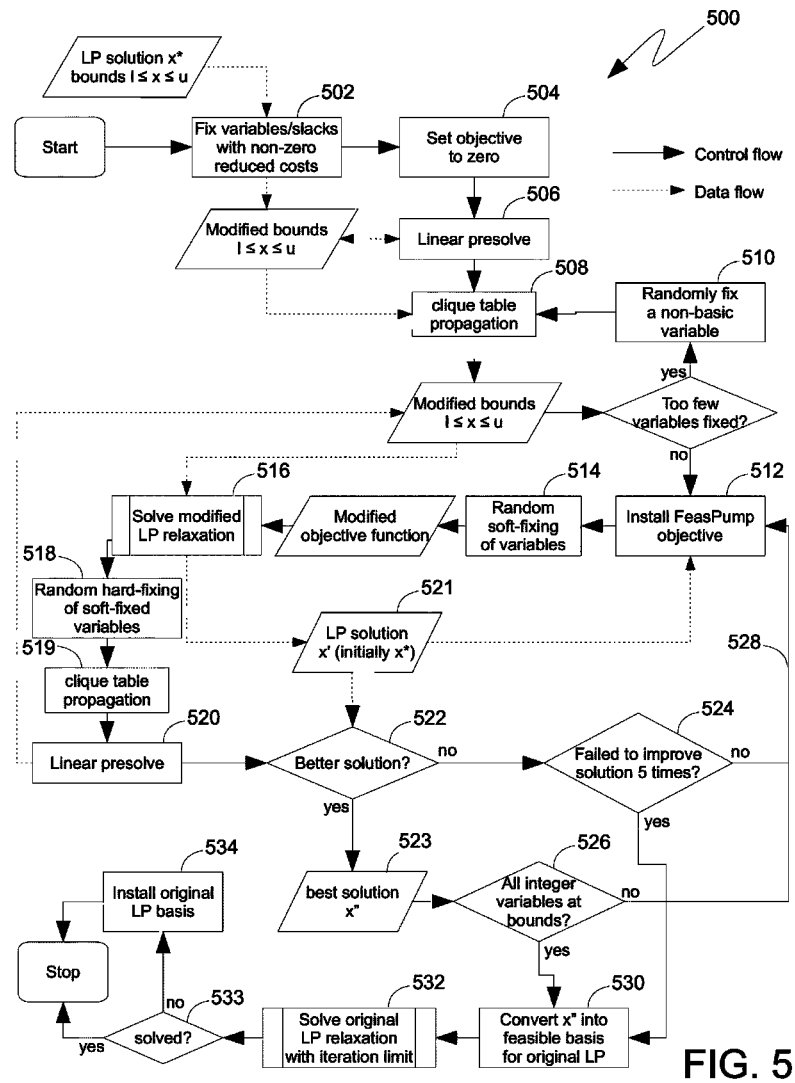
FIG. 5 is a flow chart showing a method for finding alternative LP relaxation solutions.

FIG. 5 shows a method 500 that can be used to find an alternative LP solution that has favorable MIP properties, and may be used, for example, in processing step 410.

In step 502 all variables and slacks with non-zero reduced costs in an original LP solution x* are fixed in order to restrict the search to an optimal face of the LP polyhedron.

In step 504 the objective function is set to zero and the objective sense is set to minimization.

In step 506 linear presolving is applied to derive additional fixings for the variables.

Presolving a linear model can be done by calling the public API method CPXpresolve() of CPLEX. Applying this presolving procedure at this point is advantageous in that fixings discovered by presolving may be collected to fix variables in the auxiliary LP problem.

Given an auxiliary LP problem "auxlp" (that is the original LP with modifications from the previous steps 502 and 504), step 506 may be performed as follows: First, call CPXpresolve(auxlp) on this LP to produce a presolved problem instance "pre_auxlp". Then, for all variables j, if x_j is fixed to one of its bounds in pre_auxlp, fix it to the same bound in auxlp.

In step 508 clique table propagation is applied to derive additional fixings for the variables.

A clique is a constraint on a set of binary variables and {0,1}—values that says that at most one of the variables can be set to the corresponding value. In other words, if one of them is set to the corresponding value then all other variables in the clique must be set to the opposite of their corresponding value. For example, the clique c: (x=1), (y=0), (z=1)

requires that at most one of the fixings x=1, y=0, z=1 can be used at the same time. If x is set to 1, for example, then it can be concluded immediately that y=1 and z=0.

The clique table is stored in two representations, a column-wise representation and a row-wise representation. Using the column-wise representation, for each variable/value pair x=v the program can determine in which cliques it appears. Using the row-wise representation, for each clique the program can determine which variable/value pairs are members of this clique.

An example of a clique table propagation routine is as follows:

Given: the auxiliary LP "auxlp", the clique table, and a variable x that has been fixed to value v.

1. For all cliques c in which the fixing "x=v" appears (use column-wise representation of clique table):
   (a) For all members "y=u" in clique c (use row-wise representation of clique table):
      (i) If y is not yet fixed in the auxiliary LP auxlp, then fix it to y=1−u.

After having found an implied fixing y=1−u, one could again propagate the clique table for this fixing. However, in the present embodiment, this further propagation is deliberately not applied. Furthermore, if y is already fixed in auxlp, but it is fixed to u instead of 1−u, it is clear that the fixings in auxlp can never lead to a complete integer feasible solution. Again, these infeasibilities are deliberately ignored. Both operations (further propagations and infeasibility detection) could be done in a trivial way, but they have been found to degrade the performance of the overall algorithm in terms of the quality of the resulting LP basis. This is because the aim is not necessarily to find an LP solution with all integer variables having integral solution values, but rather just to find an LP solution with as few integer variables as possible that have a fractional solution value. Therefore, applying further propagations could constrain the auxiliary problem too much and lead to infeasibilities in the auxiliary LP, even though an "almost integral" solution may exist that violates some cliques in the clique table.

In step 510, if the auxiliary LP still has too many variables compared to the original LP, then starting with variables that are currently on their upper bound, the program fixes a random non-basic variable to its current value and goes to step 508.

In one embodiment, the auxiliary LP is forced to have at most 50% of the variables in the original LP plus an additional 10000 variables; however, values other than 50% and 10000 may be used.

An example of a routine to reduce the auxiliary LP to the required size is as follows:

Given: the auxiliary LP "auxlp" and the number "norigvars" of variables in the original LP.

1. If the number "nvars" of unfixed variables in auxlp is larger than 0.5*norigvars+10000:
   (a) Randomly select a variable x_j from the set of unfixed (integer or continuous) variables that are non-basic at their upper bound in the original LP solution.
   (b) If existing, fix x_j to its upper bound and go to step 508 of the main
      program.
   (c) Randomly select a variable x_j from the set of unfixed (integer or continuous) variables that are non-basic at their lower bound in the original LP solution.
   (d) If existing, fix x_j to its lower bound and go to step 508 of the main
      program.

In step 512 a new objective function is installed based on the current LP solution in order to drive the integer variables to their bounds. In one embodiment, step 512 is only applied if, in the previous iteration of the step 512 through step 528 loop, no "hard fixings" were applied in step 518. This is because modifying both the bounds and the objective function in the auxiliary LP means losing primal and dual feasibility of the current simplex basis. Therefore, a choice is made to not change the objective function when the bounds have already been changed.

Step 512 differs from a corresponding step in the "Feasibility Pump" of Fischetti et al in the way the new objective function coefficients are chosen. The method described herein is also different from what is done in the CPLEX 11 implementation.

The objective function may be modified, for example, as follows:

Given: the auxiliary LP "auxlp" and its current solution x'.

1. If a hard fixing was applied in the previous iteration, exit this sub-procedure.

2. For all integer variables $x_j$ in auxlp that are not yet fixed and that have a finite lower or upper bound:
   (a) If the lower bound $l_j$ of $x_j$ is infinite, set the objective of $x_j$ to $c_j:=-1$ in order to drive the variable towards its upper bound.
   (b) If the upper bound $u_j$ of $x_j$ is infinite, set the objective of $x_j$ to $c_j:=+1$ in order to drive the variable towards its lower bound.
   (c) If $x'_j \geq u_j - 10^{-5}$, set $c_j:=-1$ in order to drive the variable towards its upper bound.
   (e) If $x'_j \leq l_j + 10^{-5}$, set $c_j:=+1$ in order to drive the variable towards its lower bound.
   (e) If none of (a)-(d) applies:
      (i) Set $p:=0.5*(l_j, u_j)$.
      (ii) If $x'_j \geq p$, set $c_j:=-0.8*(x'_j-p)/(u_j-p)$.
      (iii) If $x'_j < p$, set $c_j:=+0.8*(p-x'_j)/(p-l_j)$.
   (f) Perturb the objective function by $c_j:=c_j*(1+0.01/(j+N))$ with N being the total number of variables in the original LP.

In step 514, for some randomly chosen variables, a very large or very small objective coefficient is installed ("soft fixing") in order to try to force them to their bounds. In one embodiment, step 514 is only applied if in the previous iteration of the loop no "hard fixings" were applied in step 518, for the same reason previously explained in relation to step 512. Soft fixings are applied only on binary variables or integer variables with domain size of 1, and with a probability of 20%, although smaller or greater probabilities may be used. If there was no hard fixing in the previous iteration, a check is made to ensure that at least one soft fixing is performed.

The soft fixings may be performed, for example, as follows:

Given: the auxiliary LP "auxlp" and its current solution x'.

1. If a hard fixing was applied in the previous iteration, exit this sub-procedure.

2. For all integer variables $x_j$ in auxlp that are not yet fixed and that have bounds $l_j$ and $u_j$ with $u_j - l_j = 1$:
   (a) Pick a random number in [0,1]. If the random number is larger than 0.2, continue the loop with the next variable.
   (b) If $x'_j \leq 0.5*(l_j+u_j)$, set its objective coefficient to $c_j:=+1000$ in order to drive the variable towards its lower bound.
   (c) If $x'_j \geq 0.5*(l_j+u_j)$, set its objective coefficient to $c_j:=-1000$ in order to drive the variable towards its upper bound.

3. If no soft fixing was applied, apply Steps 2(b) and 2(c) on the last variable $x_j$ that was considered in Step 2(a).

In step 516 the modified auxiliary LP is solved to obtain a new solution x'. If bounds have been changed, the dual simplex algorithm is applied. If objective coefficients have been changed, the primal simplex algorithm is applied.

In the problem modification steps 512, 514, 518, and 520, either the objective function of the auxiliary LP or the bounds of the variables are modified, but not both. Therefore, the previously optimal simplex basis remains either primal or dual feasible, and the primal or dual simplex algorithm can be applied to re-solve the modified LP in a practically efficient way.

The LP re-solve of the auxiliary LP may be performed, for example, as follows:

Given: the auxiliary LP "auxlp" with its previously optimal simplex basis and a new objective function or new set of bounds.

1. If this is the first solving of the auxiliary LP or if the bounds of the variables have been changed since the previous solving:
   (a) call the dual simplex algorithm to solve the auxiliary LP.
   Otherwise:
   (b) call the primal simplex algorithm to re-solve the LP.

2. If the modified auxiliary LP has not been solved to optimality (for example, because it is infeasible or because some error occurred during the simplex solve), abort the whole procedure by going to step 530 of the main program.

In step 518, for a random subset of the variables that were subject to "soft fixing," the variables are fixed by modifying their bounds ("hard fixing"). If a "soft fixing" was successful (i.e., if the current LP value is equal to the corresponding bound), then it is fixed to this bound. If the "soft fixing" was unsuccessful, then the variable is fixed to the opposite bound. In either case, the next step 519 is to propagate the clique table as in step 508.

In one embodiment, hard fixing is applied on variables that have been "soft fixed" in the previous iteration with a probability of 50%. After each individual fixing, clique propagation is immediately applied. In each iteration of the main loop (step 512 through step 528), at most 5% (although higher or lower percentages could be used) of the total number of variables in the auxiliary LP are fixed.

The hard fixings may be performed, for example, as follows:

Given: the auxiliary LP "auxlp", its current solution x', and the number "nvars" of unfixed variables in auxlp since the last linear presolve call of step 520 or the initial auxlp setup after step 510.

1. For all integer variables $x_j$ in auxlp that are not yet fixed and that have a finite lower or upper bound:
   (a) If $x_j$ was subject to soft fixing in the previous iteration, pick a random number in [0,1].
      If the random number is smaller than 0.5, reset the objective coefficient of $x_j$ to $c_j:=0$ and continue the loop with the next variable.
   (b) If $x_j$ was soft fixed to its lower bound $l_j$, it has a finite upper bound $u_j$, and $x'_j > l_j + 10^{-5}$:
      Fix $x_j$ to $u_j$ and propagate the clique table as in step 508.
   (c) If $x_j$ was soft fixed to its upper bound $u_j$, it has a finite lower bound $l_j$, and $x'_j < u_j - 10^{-5}$:
      Fix $x_j$ to $l_j$ and propagate the clique table as in step 508.
   (d) If $x_j$ was soft fixed to its lower bound $l_j$ and $x'_j \leq l_j + 10^{-5}$:
      Fix $x_j$ to $l_j$ and propagate the clique table as in step 508.
   (e) If $x_j$ was soft fixed to its upper bound $u_j$ and $x'_j \geq u_j - 10^{-5}$:
      Fix $x_j$ to $u_j$ and propagate the clique table as in step 508.
   (f) If the number of newly fixed variables exceeds 0.05*nvars, then abort the hard fixing loop.

By way of illustrative example, consider a problem with three variables, $x_1$, $x_2$, and $x_3$ with bounds $0 \leq x_1 \leq 10$, $0 \leq x_2 \leq 10$, and $0 \leq x_3 \leq 10$. Further assume that in step 514 it was decided to "soft fix" xi to its lower bound and $x_2$ to its upper bound, and that in step 512 a regular objective coefficient for $x_3$ was chosen of, for example, +0.5. The objective function used in step 516 is assumed to be:

minimize (1000 $x_1$ −1000 $x_2$+0.5 $x_3$).

Further assume that the solution of this modified LP is $x_1'$=0.0, $x_2'$=9.5, and $x_3'$=3.1. Also assume that in both cases, for $x_1$ and for $x_2$, a random number larger than 0.5 was picked, as described in 1(a) of step 518, which means that "hard fixing" is to be applied to both variables. Now, as the soft fixing of $x_1$ was successful, in that the LP solution $x_1'$ is equal to the lower bound, therefore this variable is fixed to $x_1$=0 according to 1(d). In contrast, the soft fixing of $x_2$ was not successful, as $x_2'$<10. Consequently, as described in 1(c), $x_2$ is fixed to its opposite bound, i.e., $x_2$=0. This step does nothing to $x_3$, as this was not soft fixed.

In step 520, if a certain number of additional variables have been fixed in step 518, then another round of linear presolving may be applied as in step 506 to derive further fixings.

In one embodiment, occasionally an additional round of linear presolving is applied as in step 506, if at least 1% (although higher or lower percentages may be used) of the remaining unfixed integer variables ("nvars") were fixed due to hard fixings since the last linear presolving call.

Additional linear presolving may be peformed, for example, as follows:

Given: the auxiliary LP "auxlp" and the number "nvars" of unfixed variables in auxlp since the last linear presolve call of step 520 or the initial auxlp setup after step 510.

1. If from the "nvars" previously unfixed variables at least 1% have now been fixed:
   (a) Call CPXpresolve(auxlp) on this LP to produce a presolved problem instance "pre_auxlp".
   (b) For all variables j:
      If $x_j$ is fixed to one of its bounds in pre_auxlp, fix it to the same bound in auxlp.
   (c) Propagate the clique table as in step 508.

In step 522 a determination is made whether for x' (521) the number of integer variables at their bounds is larger than the current recorded best solution x" (523); if so then x" is set (523) to the value of x' (521).

In step 524, if the number of integer variables at their bounds did not increase for a certain number of consecutive rounds of the step 512 through step 528 loop, flow proceeds to step 530. In one implementation five is used for the maximum number of failed loops, but numbers greater than or less than five may be used.

In step 526, if all integer variables are at their bounds, flow proceeds to step 530.

If failure to improve the solution x" (523) has not yet been repeated a certain number of times, and if any of the integer variables is not at one of its bound, then flow transitions (528) back to step 512.

In step 530 the basis of the auxiliary solution with most integer variables at their bounds is converted into a primal feasible basis of the original LP relaxation.

In step 532 the original LP relaxation is solved with the given starting basis, with the primal simplex, and with an iteration limit. In one embodiment, an iteration limit of 2000 iterations is used, but a higher or lower number may be used. Solving the original LP relaxation in this way will lead to a chain of primal degenerate pivots until dual feasibility is reached.

In step 533 a determination is made whether the original LP relaxation was solved, implying that the iteration limit was not reached, in which case the obtained simplex basis is used to return x". Otherwise, flow proceeds to step 534, where the original optimal LP basis is installed, or used, to return x*.

Solving LPs that are of a size on the order of the original problem is much too expensive. Furthermore, even solving an LP of moderate size too often is also too expensive. Steps 502, 504, 512, 516, 522, and 530 may be the same as corresponding steps in the CPLEX 11 release of November 2007. The additional steps described herein ameliorate or overcome the foregoing difficulties experienced in known methods and achieve much higher practical usefulness of the overall procedure.

By operation of the additional steps introduced to the procedure as described, the LP problem size is reduced before the first LP is solved, and the size of the LP keeps decreasing during the "Feasibility Pump" loop (step 512 through step 528). In particular: (i) linear presolving (step 506) and clique propagation (step 508) decrease the size of the LP without losing any integer feasible solution in the restricted subspace; (ii) if necessary, the random fixing loop (step 508 through step 510) ensures that the initial LP is at most of a certain size, in one implementation about 50% of the variables; (iii) the random soft- (step 514) and hard-fixings (step 518), the clique table propagation of hard fixings (step 519), and intermediate linear presolving (step 520) further reduce the difficulty of the LP during the main loop (step 512 through step 528), which makes it possible to execute the main loop more often. The loop can be continued until five (although a higher or lower number could be used) consecutive LPs have been solved without finding an improved solution. In contrast, in CPLEX 11, for example, without the additional problem size reductions described herein, operations were aborted immediately if the LP was not able to find an improved solution.

Finally, an iteration limit is used to ensure that not too much time is spent resolving the original LP in the last step of the procedure.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, changes and modifications may be made without departing from this disclosure and its broader aspects. Therefore, the appended claims are to encompass within their scope all such changes and modifications as are within the true spirit and scope of this disclosure.

Furthermore, it is to be understood that the disclosure is solely defined by the appended claims. It will be understood by those with skill in the art that if a specific number of an introduced claim element is intended, such intent will be explicitly recited in. the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine implemented method of determining an allocation of physical resources comprising:
   (a) receiving a mixed integer programming (MIP) model and an outcome objective;
   (b) deriving a relaxation linear programming model (LP) associated with the MIP model;
   (c) applying a processor to the LP to compute a first optimal LP solution;
   (d) finding a set of cutting planes that separate the first optimal LP solution from a set of integer feasible solutions;
   (e) applying a processor to the LP to compute a second optimal LP solution, where the second optimal LP solution is different than the first optimal LP solution;
   (f) applying cut filtering on the set of cutting planes, using the second optimal LP solution as a reference solution such that only cutting planes that are violated by the first and second optimal LP solution are allowed to survive; and
   (g) applying cutting planes that survived the cut filtering to derive a new LP.

2. The method of claim 1, wherein the new LP derived in claim 1 item (g) is used as the LP of claim 1 item (b) in a subsequent iteration of the method.

3. The method of claim 2, comprising, when no cuts survive the cut filtering of item (f): using the second optimal LP solution in a subsequent MIP solution process to find an optimal MIP solution; and providing the optimal MIP solution to a user.

4. The method of claim 3, comprising: allocating physical resources based on the optimal MIP solution.

5. A computer program product comprising a non-transitory computer readable storage medium having computer readable program code embodied therewith, the computer readable program code comprising instructions for:
   (a) receiving a mixed integer programming (MIP) model and an outcome objective;
   (b) deriving a relaxation linear programming model (LP) associated with the MIP model;
      (c) applying a processor to the LP relaxation model to compute an optimal LP solution;
      (d) finding a set of cutting planes that separate the optimal solution of (b) from a set of integer feasible solutions;
      (e) finding an alternate optimal solution to the LP relaxation model;
      (f) applying cut filtering on the set of cutting planes, using the optimal solution of (e) as a reference solution such that only cutting planes that are violated by the first and second optimal LP solution are allowed to survive;
      (g) applying cutting planes that survived the cut filtering to derive a new LP.

6. The computer program product of claim 5, comprising instructions for using the new LP derived in claim 5 item (g) as the LP of claim 5 item (b) in a subsequent iteration of the method.

7. The computer program product of claim 5, comprising instructions for, when no cuts survive the cut filtering of item (f): using the second optimal LP solution in a subsequent MIP solution process to find an optimal MIP solution; and providing the optimal MIP solution to a user.

8. A machine-implemented method of allocating physical resources using a model comprising a mixed integer program (MIP) and using an original LP relaxation of the MIP having variables, slacks, and an objective function, the method comprising:
   solving the original LP relaxation of the MIP to obtain a first optimal LP relaxation solution; and finding a second alternative LP relaxation solution, comprising:
      (i) solving the original LP relaxation of the MIP to obtain an initial LP relaxation solution;
      (ii) fixing variables and slacks with non-zero reduced costs, and setting the objective function to zero to obtain a modified LP relaxation;
      (iii) at least some of the time, reducing the size of the modified LP relaxation by any combination of: applying linear presolving; applying clique table propagation; and/or fixing non-basic variables randomly;
      (iv) further modifying the LP relaxation by one of fixing some of the variables; and modifying the objective function;
      (v) solving the modified LP relaxation to obtain a modified LP relaxation solution;
      (vi) choosing a better solution between a current best LP relaxation solution and the modified LP relaxation solution to obtain a new current best LP relaxation solution;
      (vii) converting the current best LP relaxation solution into a primal feasible basis for the original LP relaxation;
      (viii) attempting to solve the original LP relaxation starting from said primal feasible basis; and
      (ix) if step (viii) was successful, using a resulting basis in a subsequent MIP solving process using cutting planes, in which only cutting planes that are violated by both the first and second optimal LP solutions are allowed to survive.

9. The method of claim 8, further comprising repeating steps (iv)-(vi) until one of the following: all integer variables are at their bounds; or steps (iv)-(vi) have been repeated a certain number of times without the modified LP relaxation solution being better than the current best LP relaxation solution.

10. The method of claim 8, in step (iv) of which modifying the objective function comprises: installing a new objective function for the modified LP relaxation based on a last LP relaxation solution; and installing a very large or very small objective coefficient for each of some randomly chosen variables in the modified LP relaxation.

11. The method of claim 10, in step (iv) of which fixing some of the variables comprises fixing a random subset of variables that have been assigned very large or very small objective coefficients at step (iv) of a previous iteration of a loop comprising steps (iv)-(vi).

12. The method of claim 8, wherein the solving of step (v) comprises applying a dual simplex algorithm if variables have been fixed, and applying a primal simplex algorithm if objective coefficients have been changed.

13. The method of claim 8, in step (viii) of which attempting to solve the original LP relaxation is performed subject to an iteration limit.

14. A computer program product for allocating physical resources using a model comprising a mixed integer program (MIP) and using an original LP relaxation of the MIP having variables, slacks, and an objective function, comprising a non-transitory computer readable storage medium having computer readable program code embodied therewith, the computer readable program code comprising instructions for:
   solving the original LP relaxation of the MIP to obtain a first optimal LP relaxation solution; and
   finding a second alternative LP relaxation solution, comprising instructions for:
      (i) solving the original LP relaxation of the MIP to obtain an initial LP relaxation solution;
      (ii) fixing variables and slacks with non-zero reduced costs, and setting the objective function to zero to obtain a modified LP relaxation;
      (iii) at least some of the time, reducing the size of the modified LP relaxation by any combination of: applying linear presolving; applying clique table propagation; and/or fixing non-basic variables randomly;
      (iv) further modifying the LP relaxation by one of fixing some of the variables; and modifying the objective function;
      (v) solving the modified LP relaxation to obtain a modified LP relaxation solution;
      (vi) choosing a better solution between a current best LP relaxation solution and the modified LP relaxation solution to obtain a new current best LP relaxation solution;
      (vii) converting the current best LP relaxation solution into a primal feasible basis for the original LP relaxation;
      (viii) attempting to solve the original LP relaxation starting from said primal feasible basis; and
      (ix) if step (viii) was successful, using a resulting basis in a subsequent MIP solving process using cutting planes, in which only cutting planes that are violated by both the first and second optimal LP solutions are allowed to survive.

15. The computer program product of claim 14, further comprising instructions for repeating steps (iv)-(vi) until one of the following: all integer variables are at their bounds; or steps (iv)-(vi) have been repeated a certain number of times without the modified LP relaxation solution being better than the current best LP relaxation solution.

16. The computer program product of claim 14, in step (iv) of which modifying the objective function comprises instructions for: installing a new objective function for the modified LP relaxation based on a last LP relaxation solution; and installing a very large or very small objective coefficient for each of some randomly chosen variables in the modified LP relaxation.

17. The computer program product of claim 16, in step (iv) of which fixing some of the variables comprises instructions for fixing a random subset of variables that have been assigned very large or very small objective coefficients at step (iv) of a previous iteration of a loop comprising steps (iv)-(vi).

18. The computer program product of claim 14, wherein the solving of step (v) comprises instructions for applying a dual simplex algorithm if variables have been fixed, and applying a primal simplex algorithm if objective coefficients have been changed.

19. The computer program product of claim 14, in step (viii) of which attempting to solve the original LP relaxation comprises instructions for attempting to solve the original LP relaxation subject to an iteration limit.

20. A MIP solver comprising: one or more processors for executing instructions; one or more memories storing instructions and coupled to said one or more processors, the one or more processors and the one or more memories being configured for:
   (a) receiving a mixed integer programming (MIP) model and an outcome objective;
   (b) deriving a relaxation linear programming model (LP) associated with the MIP model;
   (c) applying a processor to the LP to compute a first optimal LP solution;
   (d) finding a set of cutting planes that separate the first optimal LP solution from a set of integer feasible solutions;
   (e) applying a processor to the LP to compute a second optimal LP solution, where the second optimal LP solution is different than the first optimal LP solution;
   (f) applying cut filtering on the set of cutting planes, using the second optimal LP solution as a reference solution such that only cutting planes that are violated by the first and second optimal LP solution are allowed to survive; and
   (g) applying cutting planes that survived the cut filtering to derive a new LP.

21. The MIP solver of claim 20, wherein the one or more processors and the one or more memories are configured such that the new LP derived in claim 22 item (g) is used as the LP of claim 22 item (b) in a subsequent iteration.

22. The MIP solver of claim 21, comprising an output device coupled to the one or more processors, wherein the one or more processors and the one or more memories are configured for, when no cuts survive the cut filtering of item (f): using the second optimal LP solution in a subsequent MIP solution process to find an optimal MIP solution; and providing the optimal MIP solution to a user via the output device.

23. A MIP solver for allocating physical resources using a model comprising a mixed integer program (MIP) and using an original LP relaxation of the MIP having variables, slacks, and an objective function, comprising:
   one or more processors for executing instructions;
   one or more memories storing instructions and coupled to said one or more processors, the one or more processors and the one or more memories being configured for:
      solving the original LP relaxation of the MIP to obtain a first optimal LP relaxation solution; and
      finding a second alternative LP relaxation solution, comprising:
         (i) solving the original LP relaxation of the MIP to obtain an initial LP relaxation solution;
         (ii) fixing variables and slacks with non-zero reduced costs, and setting the objective function to zero to obtain a modified LP relaxation;
         (iii) at least some of the time, reducing the size of the modified LP relaxation by any combination of: applying linear presolving; applying clique table propagation; and/or fixing non-basic variables randomly;
         (iv) further modifying the LP relaxation by one of fixing some of the variables; and modifying the objective function;
         (v) solving the modified LP relaxation to obtain a modified LP relaxation solution;
         (vi) choosing a better solution between a current best LP relaxation solution and the modified LP relaxation solution to obtain a new current best LP relaxation solution;

(vii) converting the current best LP relaxation solution into a primal feasible basis for the original LP relaxation;
(viii) attempting to solve the original LP relaxation starting from said primal feasible basis; and
(ix) if step (viii) was successful, using a resulting basis in a subsequent MIP solving process using cutting planes, in which only cutting planes that are violated by both the first and second optimal LP solutions are allowed to survive.

24. The MIP solver of claim 23, wherein the one or more processors and the one or more memories are configured for repeating steps (iv)-(vi) until one of the following: all integer variables are at their bounds; or steps (iv)-(vi) have been repeated a certain number of times without the modified LP relaxation solution being better than the current best LP relaxation solution.

25. The MIP solver of claim 23, wherein the one or more processors and the one or more memories are configured for, in step (iv), modifying the objective function by: installing a new objective function for the modified LP relaxation based on a last LP relaxation solution; and installing a very large or very small objective coefficient for each of some randomly chosen variables in the modified LP relaxation.

26. The MIP solver of claim 25, wherein the one or more processors and the one or more memories are configured for, in step (iv), fixing some of the variables by fixing a random subset of variables that have been assigned very large or very small objective coefficients at step (iv) of a previous iteration of a loop comprising steps (iv)-(vi).

27. The MIP solver of claim 23, wherein the one or more processors and the one or more memories are configured for, in step (v), applying a dual simplex algorithm if variables have been fixed, and applying a primal simplex algorithm if objective coefficients have been changed.

* * * * *